United States Patent
Duvall

(10) Patent No.: US 9,686,910 B2
(45) Date of Patent: Jun. 27, 2017

(54) TRIMMER HEAD

(71) Applicant: Randy A. Duvall, Las Vegas, NV (US)

(72) Inventor: Randy A. Duvall, Las Vegas, NV (US)

(*) Notice: Subject to any disclaimer, the term of this patent is extended or adjusted under 35 U.S.C. 154(b) by 192 days.

(21) Appl. No.: 14/687,588

(22) Filed: Apr. 15, 2015

(65) Prior Publication Data

US 2015/0289445 A1   Oct. 15, 2015

Related U.S. Application Data

(60) Provisional application No. 61/979,941, filed on Apr. 15, 2014.

(51) Int. Cl.
*A01D 34/416* (2006.01)
*A01D 34/412* (2006.01)

(52) U.S. Cl.
CPC ..... *A01D 34/4165* (2013.01); *A01D 34/4166* (2013.01); *A01D 34/412* (2013.01)

(58) Field of Classification Search
CPC .... A01D 34/90; A01D 34/412; A01D 34/416; A01D 34/4161; A01D 34/4162; A01D 34/4163; A01D 34/4165; A01D 34/4166
USPC .............................................. 31/276; 30/276
See application file for complete search history.

(56) References Cited

U.S. PATENT DOCUMENTS

| | | | | |
|---|---|---|---|---|
| 6,141,879 | A * | 11/2000 | Arnetoli | A01D 34/4163 30/276 |
| 7,614,153 | B2 * | 11/2009 | Guerra | A01D 34/733 30/276 |
| 8,025,249 | B2 * | 9/2011 | Alliss | A01D 34/4165 242/388.1 |
| 2004/0154276 | A1 * | 8/2004 | Brandon | A01D 34/4166 56/12.7 |
| 2012/0260508 | A1 * | 10/2012 | Duvall | A01D 34/4166 30/347 |

* cited by examiner

*Primary Examiner* — Stephen Choi
*Assistant Examiner* — Evan Macfarlane

(57) ABSTRACT

A trimmer head that can be attached to trimmer stems of varied length includes a stem attachment point, a lift, a base, a pull and twist mechanism, a plurality of blade posts, and a plurality of resting cavities. The trimmer stem is attached to the stem attachment point. The stem attachment point is positioned in between the lift and the base allowing the trimmer head to receive longer trimmer stems. Trimmer blades or trimmer lines are attached to the plurality of blade posts. The lift and the base are positioned adjacent to each other. Moreover, the plurality of blade posts are oriented towards the base. By using the pull and twist mechanism, the trimmer blades or the trimmer lines are positioned in between the lift and the base. The lift is offset from the base providing a maximum range of motion for the attached trimmer blades or trimmer lines.

10 Claims, 17 Drawing Sheets

TRIMMER HEAD

The current application claims a priority to the U.S. Provisional Patent application Ser. No. 61/979,941 filed on Apr. 15, 2014.

FIELD OF THE INVENTION

The present invention relates generally to the field of gardening appliances. More specifically, the present invention introduces a trimmer head that can be utilized with trimmers with different sized trimmer stems.

BACKGROUND OF THE INVENTION

Trimmers are used for a variety of activities, which includes cutting grass, weeds, and other comparable vegetation. Even though, some trimmers can be used for a variety of activities, most trimmers are limited to only one activity. More specifically, a trimmer that is used for cutting grass might cause issues when being used on vegetation. The difficulties are caused due to the limitations of the trimmer head. The trimmer head contains the trimmer blades or trimmer lines that make contact with a desired surface or object. In most traditional trimmer heads, the trimmer blades have a limited range of motion. The restrictions in range can cause difficulty to the trimmer operator especially when the blades strike a hard surface.

The trimmer head is the main difference among the available trimmers in the industry. The nature of the blades or lines and the rotation speed of the trimmer head are critical factors in deciding the surface the trimmer can be used on. A considerable number of trimmer blades and lines available in the industry are similar in strength and quality, and can be used on a variety of trimmers. However, all trimmer heads cannot be interchangeably used on trimmers. The length of the trimmer stem is a main factor in deciding the trimmer head it can be used on. However, due to the prevailing competition in the industry, manufacturers build trimmer heads that can only be used on a specific trimmer. For instance, a number of trimmer heads available in the market do not have an opening through to the bottom surface. Therefore, such trimmer heads cannot be used on trimmers with long stems. Nevertheless, the trimmer heads that can be used on multiple trimmers have to be disassembled prior to installation on a trimmer. Due to the disassembling process, components can be improperly installed and may also be misplaced. Therefore, the disassembly process can be both stressful and time consuming.

The objective of the present invention is to address the aforementioned issues. More specifically, the present invention introduces a trimmer head that can be installed on a variety of trimmers. The trimmers that the present invention can be used on include, but are not limited to, gas trimmers, cordless trimmers, or electric trimmers that contains a long stem. Furthermore, the present invention eliminates the need to disassemble the trimmer head. More specifically, the effective design of the present invention allows the trimmer head to be attached to the trimmer directly. Additionally, the present invention also addresses the issue of the trimmer blades or pivoting trimmer lines having a limited range of motion. The additional range of motion provided by the effective design of the present invention allows the trimmer to operate smoothly.

DETAIL DESCRIPTIONS OF THE INVENTION

Figure 1:
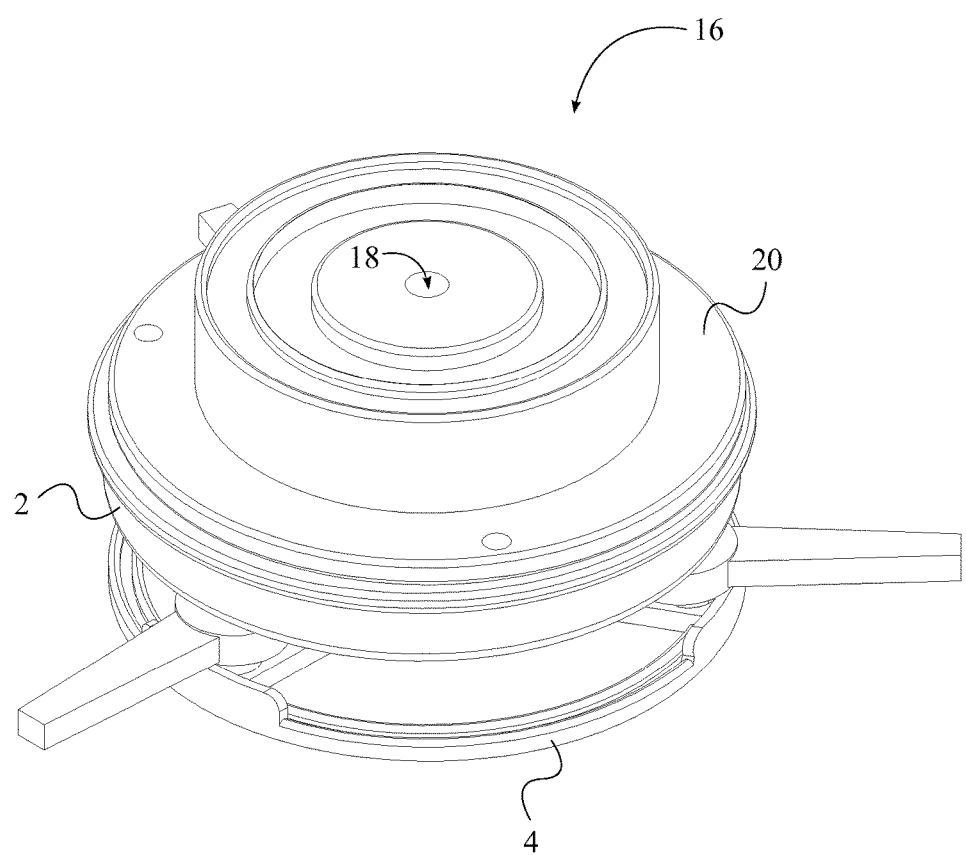
FIG. 1 is a perspective view of the present invention, wherein the trimmer blades are attached to a plurality of blade posts.

All illustrations of the drawings are for the purpose of describing selected versions of the present invention and are not intended to limit the scope of the present invention.

The present invention is a trimmer head that can be installed on a variety of trimmers. More specifically, the present invention can be installed on a gas trimmer, cordless trimmer, or an electric trimmer regardless of the trimmer stem length. Most existing trimmer heads need to be disassembled prior to being installed on a trimmer. The tedious procedure can be stressful and time consuming for the user. The effective design of the present invention allows the trimmer head to be directly installed onto the trimmer. Therefore, the electric trimmers and the cordless trimmers available in the market today can be used along with the present invention with no manufactural changes. As an additional benefit, the effective design of the present invention provides smoother operation by introducing a wider range of motion for the attached trimmer blades and also the attached trimmer line holders.

The present invention is intended to be connected to a trimmer stem which can vary in length. As illustrated in FIGS. 1-8, the present invention comprises a stem attachment point 1, a lift 2, a base 4, a pull and twist mechanism 6, a plurality of blade posts 12, and a plurality of resting cavities 13. When the present invention is utilized on a trimmer, the trimmer stem establishes a connection with the stem attachment point 1. In the preferred embodiment of the present invention, the stem attachment point 1 is hexagonal in shape. However, the stem attachment point 1 can be any other shape which has the ability to receive a standard trimmer stem. The lift 2 and the base 4 are positioned adjacent to each other. The user controls the lift 2 and the base 4 when inserting trimmer blades or removing trimmer blades from the present invention. The lift 2 and the base 4 are also utilized when inserting trimmer line holders or removing trimmer line holders. In order to do so, the lift 2 is retractably and rotatably connected to the base 4 by the pull and twist mechanism 6. The pull and twist mechanism 6 eliminates the need to disassemble the present invention when inserting or removing trimmer blades.

Figure 2:
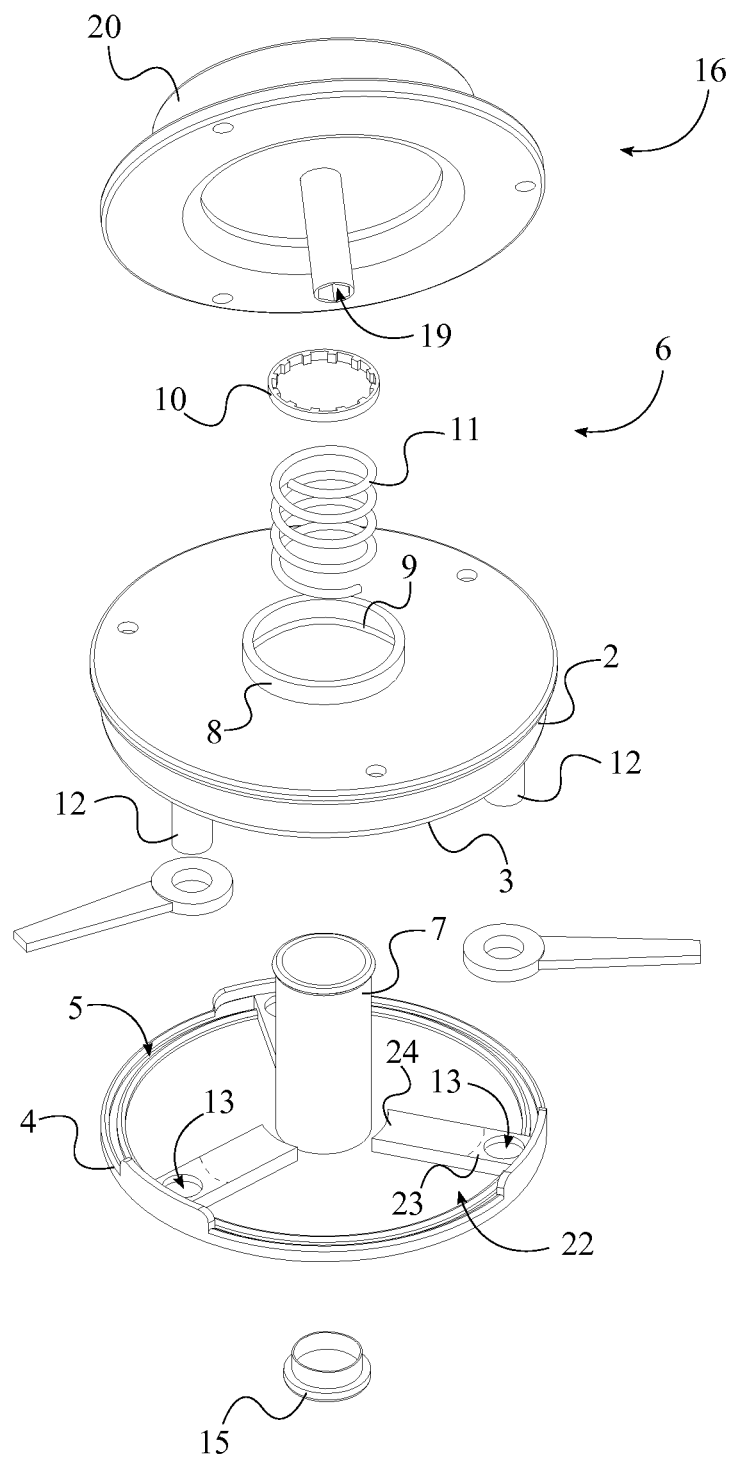
FIG. 2 is an exploded view of the present invention.
Figure 3:
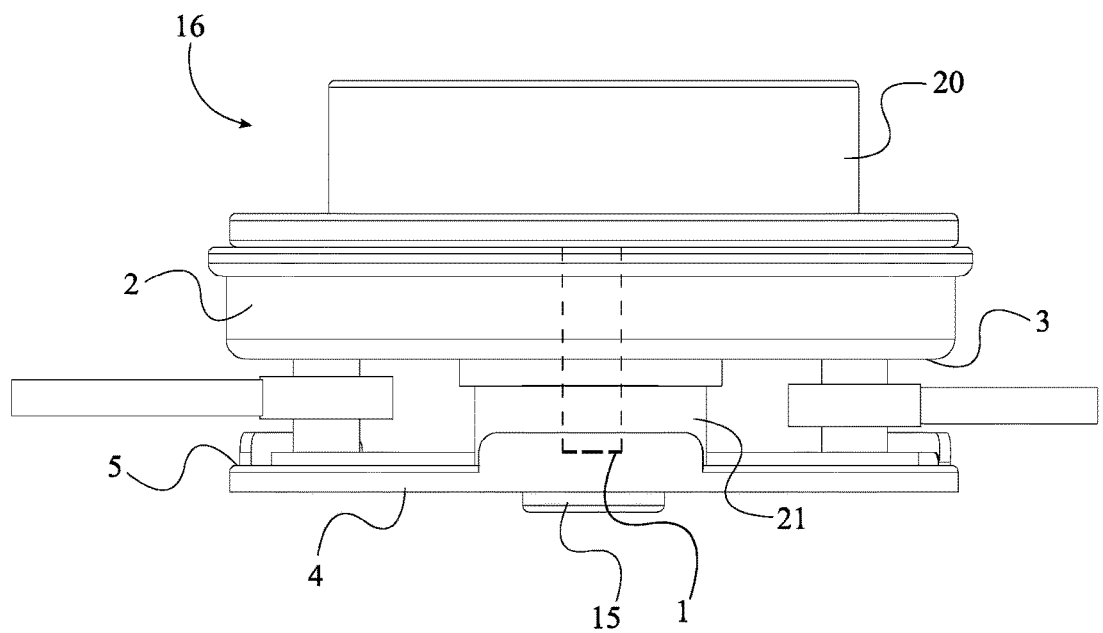
FIG. 3 is a front view of the present invention.
Figure 4:
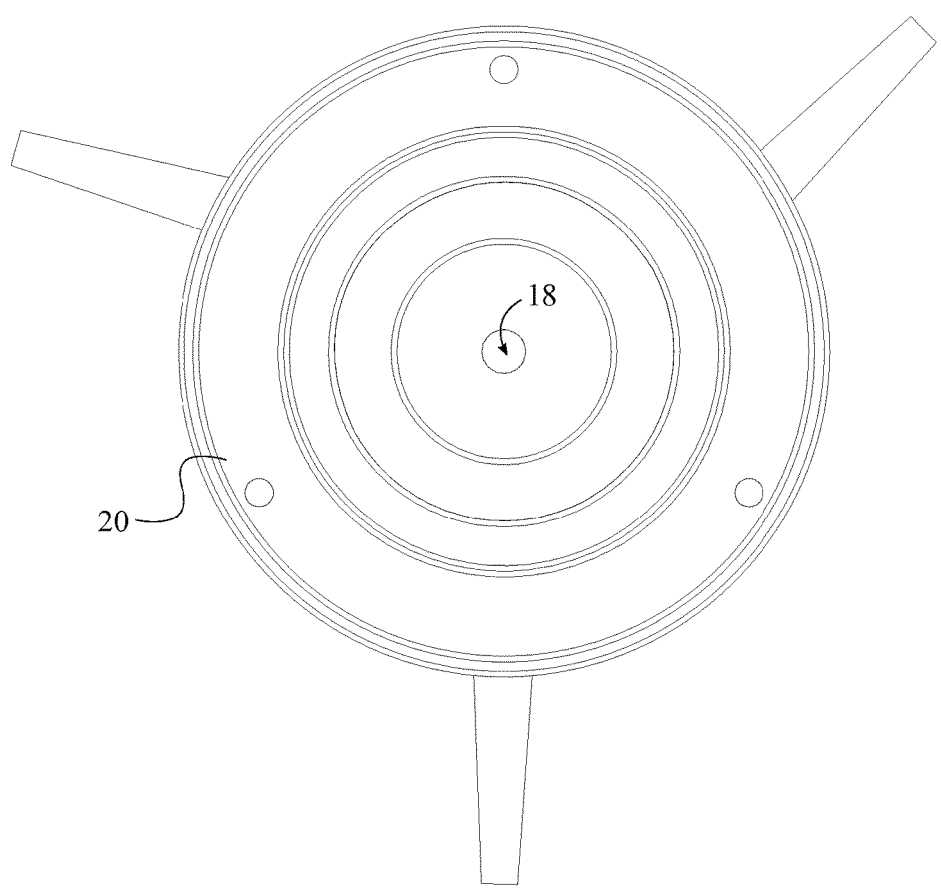
FIG. 4 is a top view of the present invention.
Figure 11:
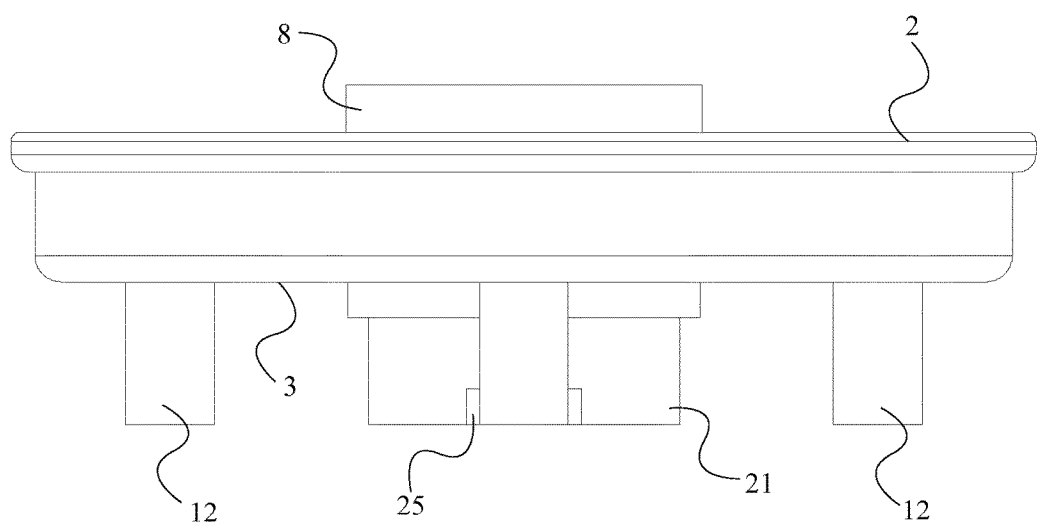
FIG. 11 is a front view of the lift of the present invention.

As illustrated in FIG. 2, the trimmer blades or the trimmer line holders are connected to the present invention through the plurality of blade posts 12. In the preferred embodiment of the present invention, the plurality of blade posts 12 are peripherally distributed about the lift 2. However, in another embodiment of the present invention, the plurality of blade posts 12 can also be peripherally distributed about the base 4. In order to position the trimmer blades in between the lift 2 and the base 4, the plurality of blade posts 12 is oriented towards the base 4. As illustrated in FIG. 11, each of the plurality of blade posts 12 is positioned normal to the lift 2 such that the trimmer blades have a maximum range of motion when attached to the plurality of blade posts 12.

Figure 10:
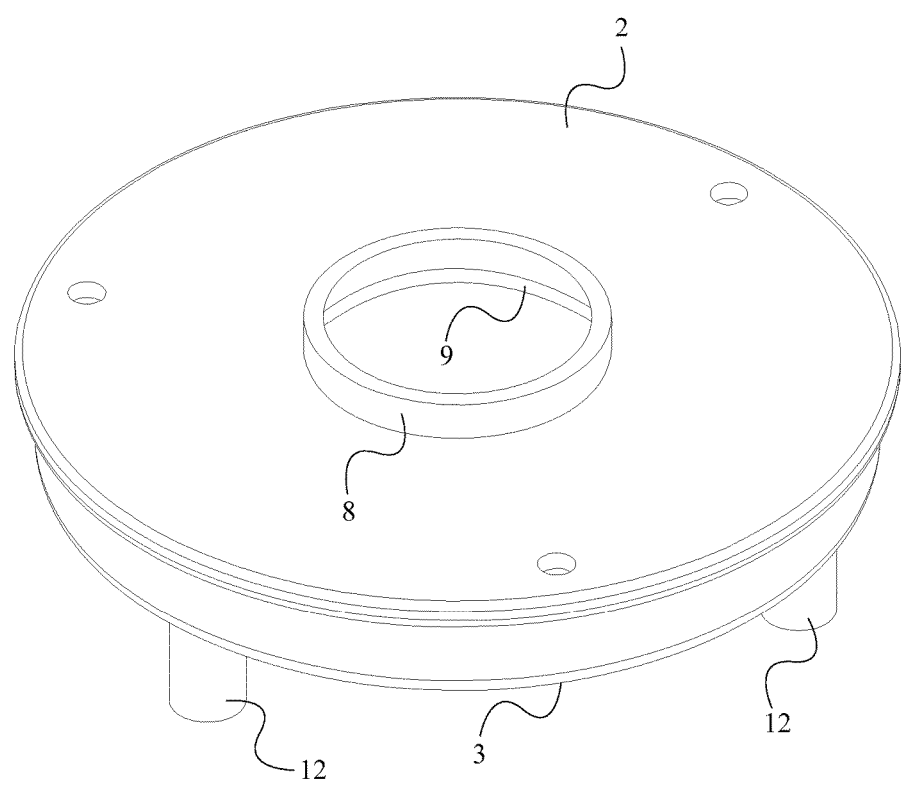
FIG. 10 is a perspective view illustrating a lift of the present invention.
Figure 12:
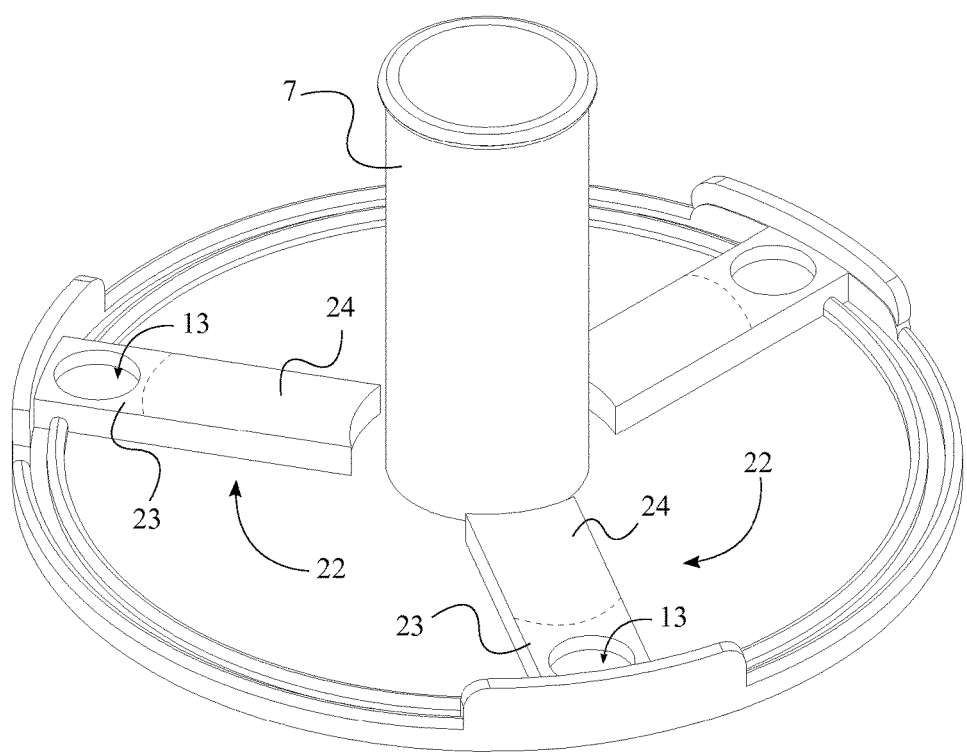
FIG. 12 is a perspective view illustrating the base of the present invention.

The plurality of resting cavities 13 receives the plurality of blade posts 12. Since the plurality of blade posts 12 is extended from the lift 2 towards the base 4, each of the plurality of resting cavities 13 traverses into the base 4 in order to accommodate the plurality of blade posts 12. The lift 2 and the base 4 are similar in shape. As illustrated in FIG. 10 and FIG. 12, both the lift 2 and the base 4 are circular in shape in the preferred embodiment of the present invention. Since the plurality of blade posts 12 is peripherally distributed about circular shape of the lift 2, the plurality of resting cavities 13 is perimetrically distributed about the circular shape of the base 4 as well. The positioning of the plurality of resting cavities 13 ensures that each of the plurality of blade posts 12 is selectively engaged to a corresponding cavity from the plurality of resting cavities 13.

Figure 13:
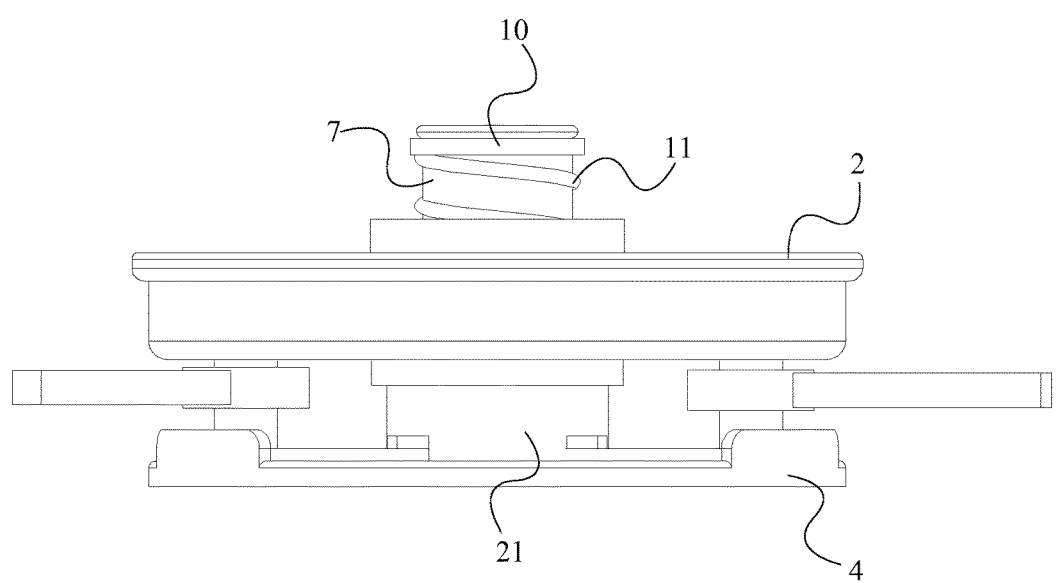
FIG. 13 is a front view illustrating the pull and twist mechanism.
Figure 14:
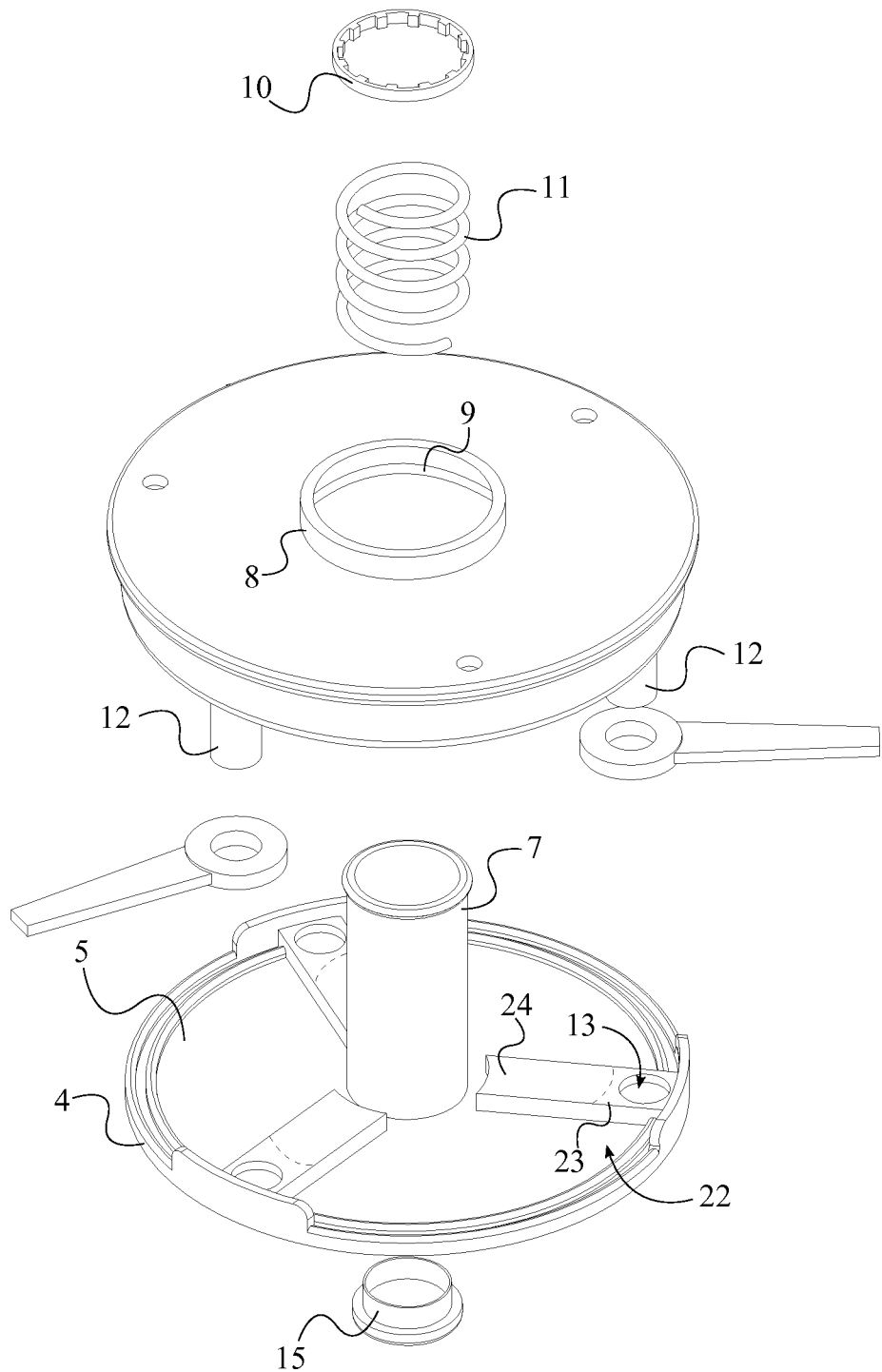
FIG. 14 is an exploded view of the pull and twist mechanism.

As mentioned earlier, the lift 2 is retractably and rotatably connected to the base 4 with the pull and twist mechanism 6. As seen in FIG. 13 and FIG. 14, the pull and twist mechanism 6 comprises an inner tube 7, an outer tube 8, an annular rim 9, an annular stopper 10, and a spring 11. The inner tube 7 is centrally connected onto the base 4 and creates a continuous path for the trimmer stem that extends from the base 4 towards the lift 2. The outer tube 8 and the annular rim 9 create a continuous path for the trimmer stem at the lift 2. In order to do so, the outer tube 8 is centrally integrated through the lift 2. Contrarily, the annular rim 9 is perimetrically connected within the outer tube 8 such that any movement of the trimmer stem within the outer tube 8 is minimized. Since the lift 2 is positioned adjacent the base 4, the inner tube 7 is positioned within the annular rim 9. However, for the lift 2 to be retractably connected to the base 4, the inner tube 7 is slidably engaged through the annular rim 9. The retractablilty between the lift 2 and the base 4 is controlled by the spring 11 and the annular stopper 10. In order to do so, the annular stopper 10 is laterally connected to the inner tube 7, offset from the annular rim 9. Furthermore, the spring 11 is located within the outer tube 8 and around the inner tube 7. Therefore, the retractable length is determined by the spring 11 which is pressed against the annular rim 9 by the annular stopper 10. When considering the pull and twist mechanism 6, the inner tube 7 has the smallest diameter and the outer tube 8 has the largest diameter. Therefore, when the inner tube 7, the annular rim 9, and the outer tube 8 are concentrically positioned, and a cross section is taken into consideration, the inner tube 7 is the inmost layer. On the other hand, the outer tube 8 is the outmost layer. The arrangement between the inner tube 7, the annular rim 9, and the outer tube 8 create a continuous hollow path for the trimmer stem to travel through within the lift 2 and the base 4. More specifically, the continuous hollow path traverses through the lift 2 towards the base 4 and intersects with the stem attachment point 1. Therefore, the present invention can be used with trimmer stems of different lengths since the continuous hollow path can receive trimmer stem of different lengths. The present invention further comprises a dust cap 15. When the present invention is used, the base 4 is the closest component to the trimming surface. Therefore, the dust that occurs during trimming can accumulate within the present invention. In order to minimize dust accumulation and increase longevity of the present invention, the dust cap 15 is attached into the inner tube 7, adjacent to the base 4.

Figure 5:
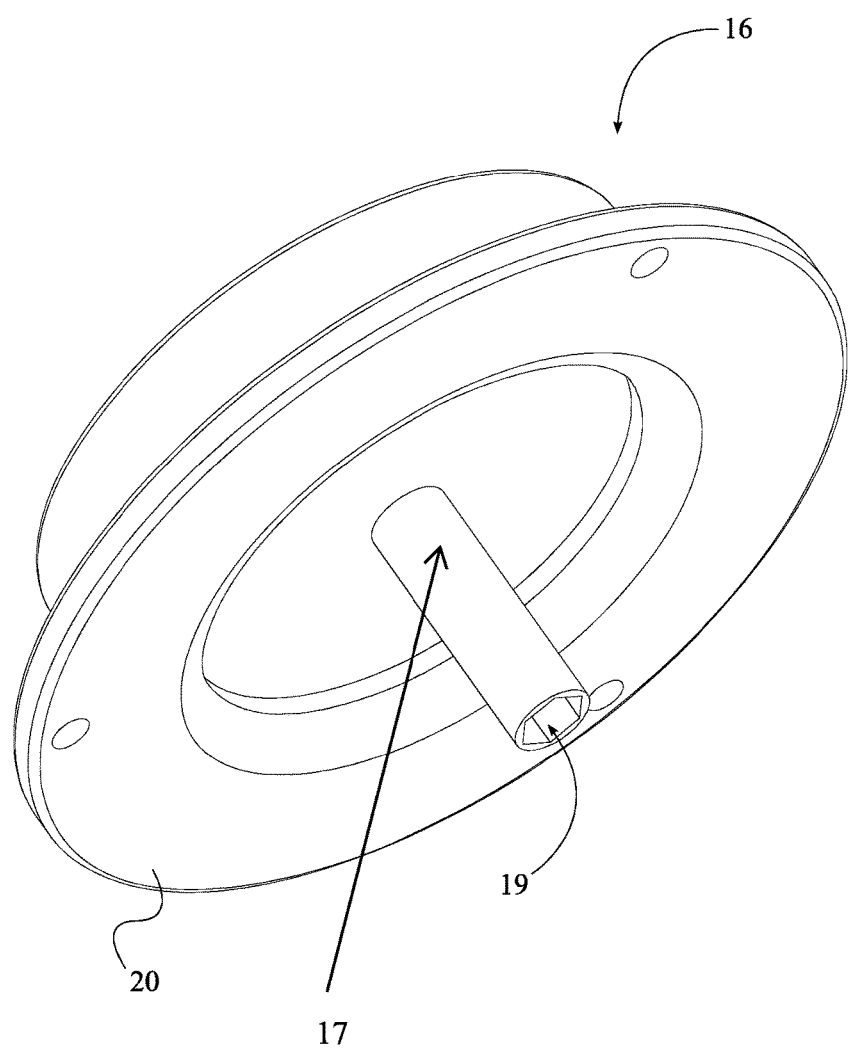
FIG. 5 is a perspective view of a trimmer interface.
Figure 6:
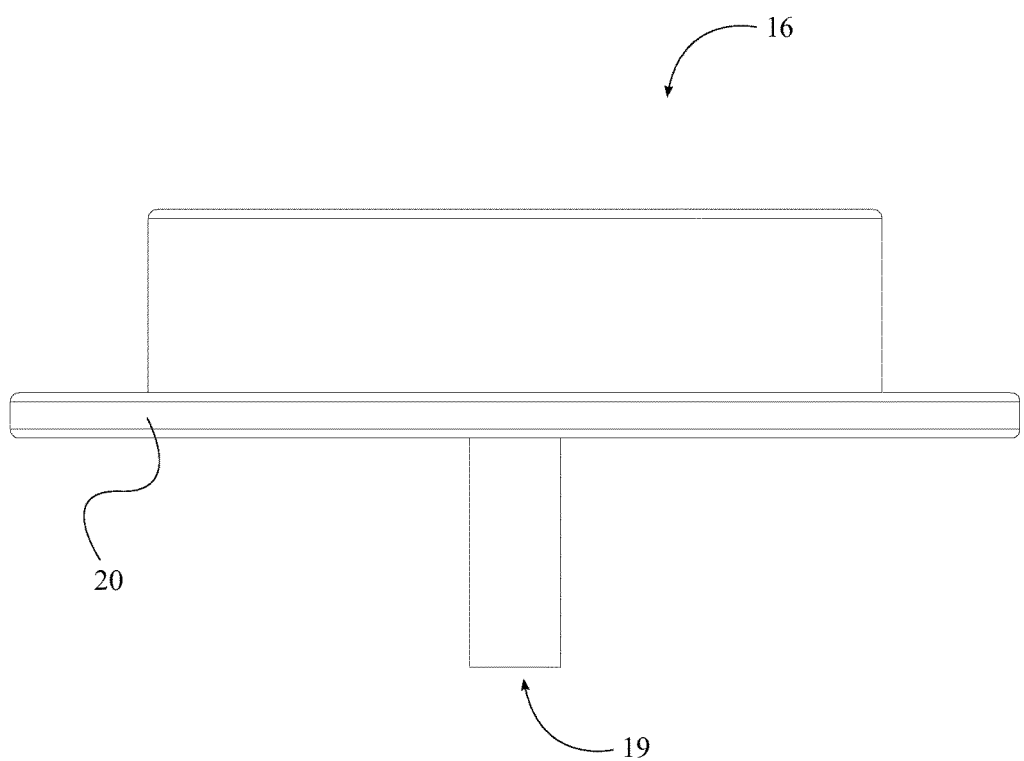
FIG. 6 is a front view of the trimmer interface.
Figure 7:
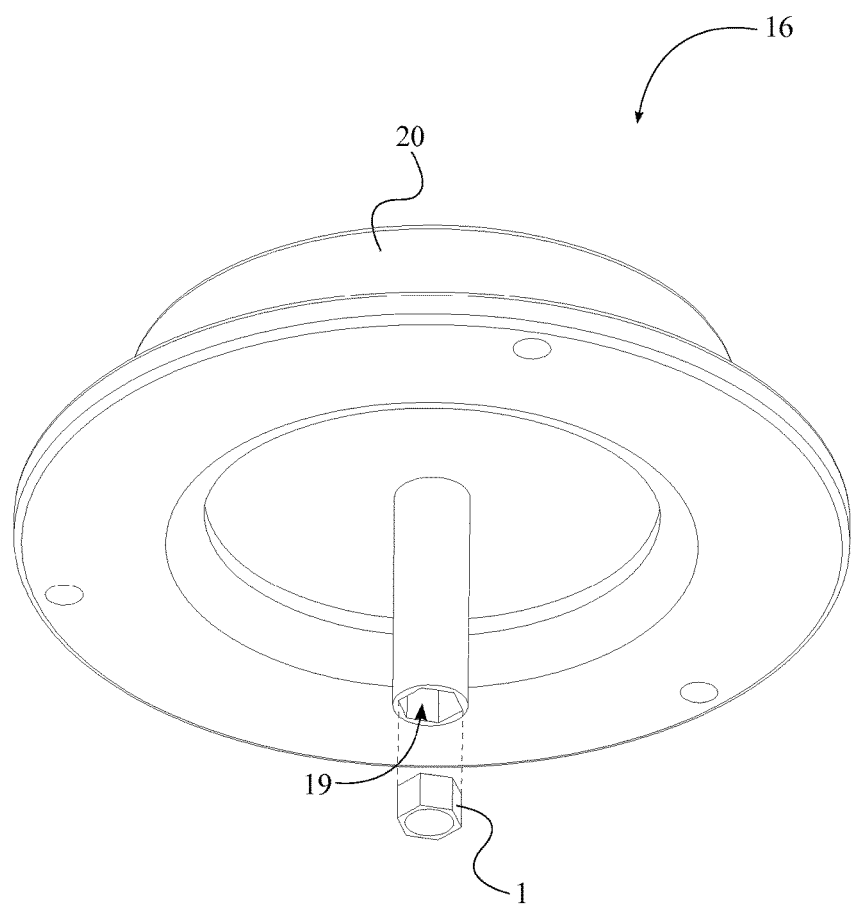
FIG. 7 is another view of the trimmer interface, wherein a stem attachment point is illustrated.
Figure 8:
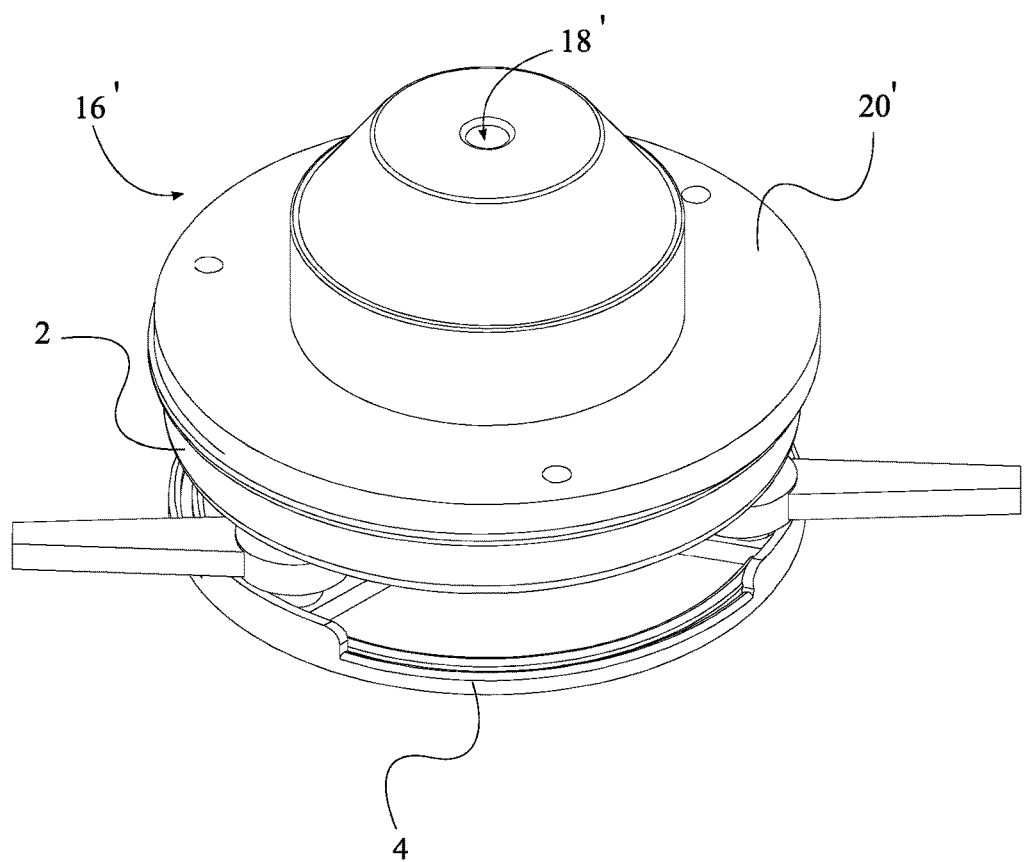
FIG. 8 is a perspective view of the present invention with a second embodiment for a cap of the trimmer interface.
Figure 9:
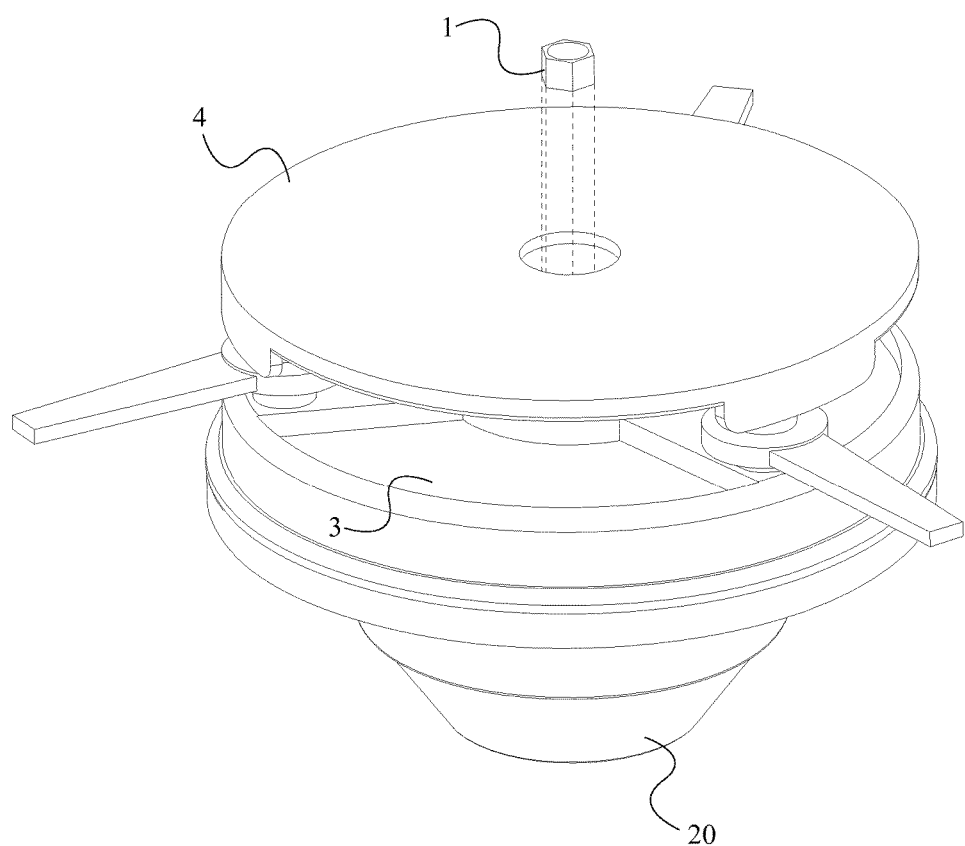
FIG. 9 is bottom perspective view of the present invention, wherein the stem attachment point is manually inserted.

The present invention receives the trimmer stem through a trimmer interface 16. As illustrated in FIGS. 5-7, the trimmer interface 16 comprises a stem sleeve 17 and a cap 20. The cap 20, which can differ in different embodiments of the present invention, is mounted onto the lift 2, opposite the base 4. FIG. 8 illustrates a different embodiment of the trimmer interface 16'. The stem sleeve 17 guides the trimmer stem to the stem attachment point 1. The length of the stem sleeve 17 is such that the stem attachment point 1 is positioned in between the lift 2 and the base 4. In connecting the trimmer stem to the stem attachment point 1, a first end 18' of the stem sleeve 17 is laterally connected to the cap 20'. The trimmer stem is inserted through the first end 18'. On the other hand, the stem attachment point 1 is internally connected to a second end 19 of the stem sleeve 17. Since the stem attachment point 1 is positioned in between the lift 2 and the base 4, the stem sleeve 17 concentrically traverses into the inner tube 7. Therefore, the stem sleeve 17, the outer tube 8, the annular rim 9, and the inner tube 7 are concentrically positioned such that the continuous hollow path extends from the trimmer interface 16' to the base 4. In the preferred embodiment of the present invention, the stem attachment point 1 is a nut that is fixed at the second end 19 and intersects with the continuous hollow path. FIG. 7 is an illustration of the stem attachment point 1 of the present invention. However, in another embodiment of the present invention, the nut can be removably attached such that the user inserts the nut manually as illustrated in FIG. 9. In doing so, the user inserts the nut through the inner tube 7 adjacent to the base 4 such that the nut is ultimately placed at the second end 19 of the stem sleeve 17. Additionally, the continuous hollow path can also be utilized to receive different nuts and bolts which are essential to attach the present invention to different trimmers without disassembling the trimmer head.

Figure 15:
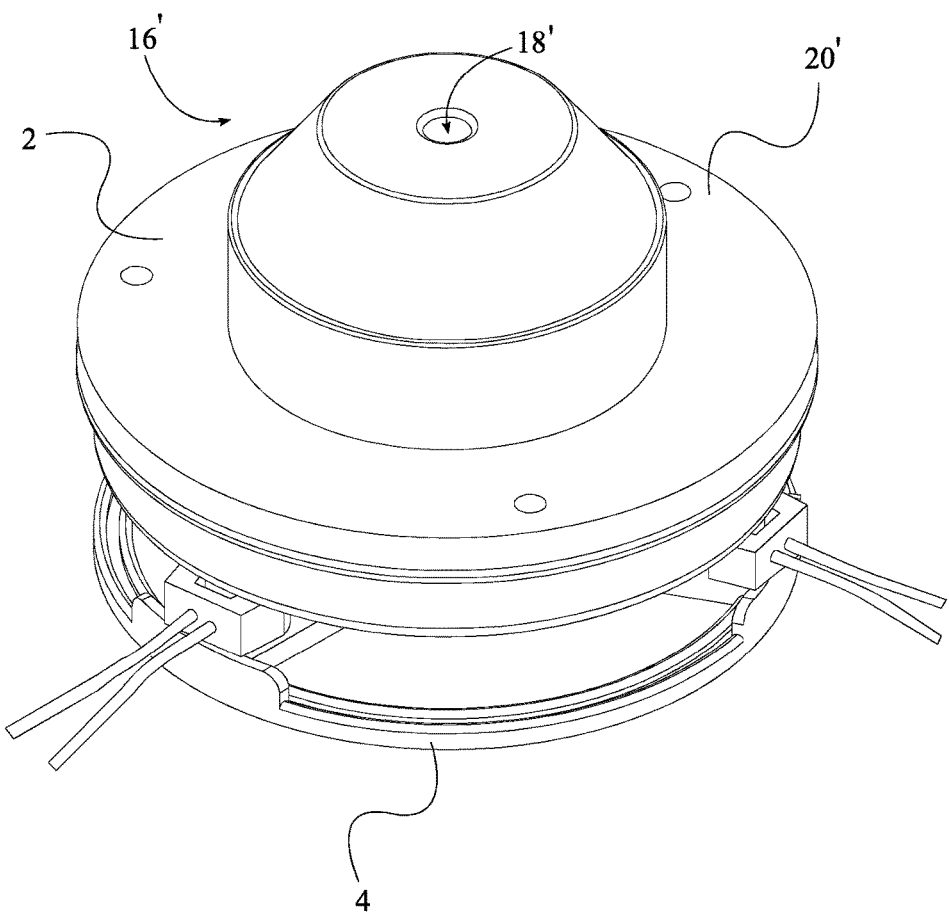
FIG. 15 is another perspective view of the present invention, wherein the trimmer line holders are attached to the plurality of blade posts.

As discussed earlier, the present invention provides a wider range of motion for the trimmer blades or the trimmer lines. As seen in FIG. 15, the trimmer blades or the trimmer lines are attached to the plurality of blade posts 12 in between the lift 2 and the base 4. In order to provide a maximum range of motion, a top surface 5 of the base 4 and a bottom surface 3 of the lift 2 are positioned offset from each other. In other words, the distance between the top surface 5 of the base 4 and the bottom surface 3 of the lift 2 is determined by the height of the plurality of blade posts. Since the distance between the lift 2 and the base 4 is uniform along the perimeter of the lift 2, a trimmer blade or a trimmer line has an increased range of motion when pivoting about one of the plurality of blade posts 12.

Figure 16:
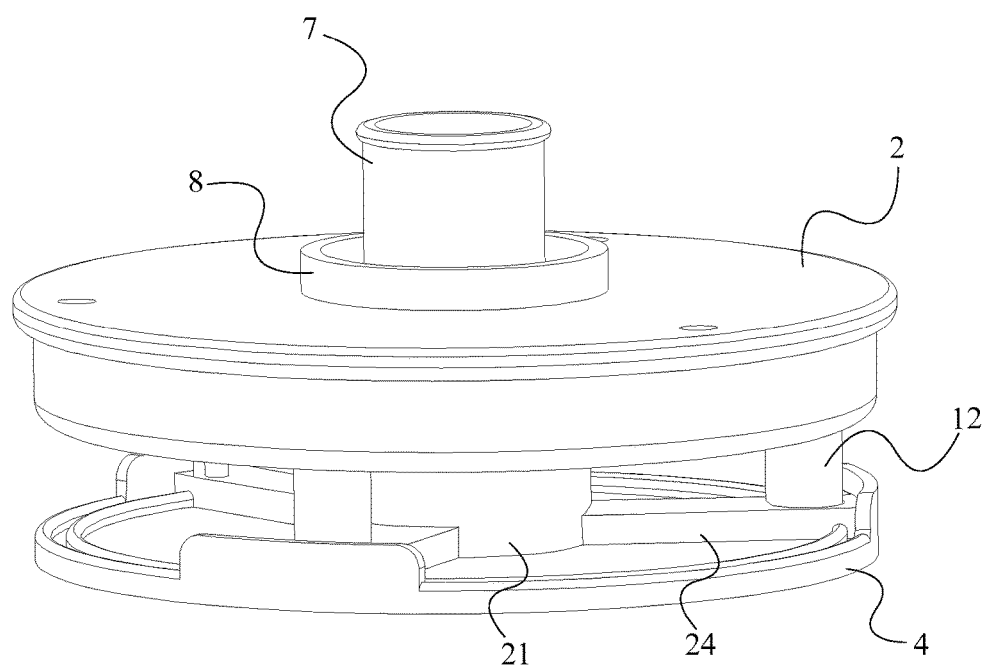
FIG. 16 is a perspective view of the lift and the base in a retracted configuration.
Figure 17:
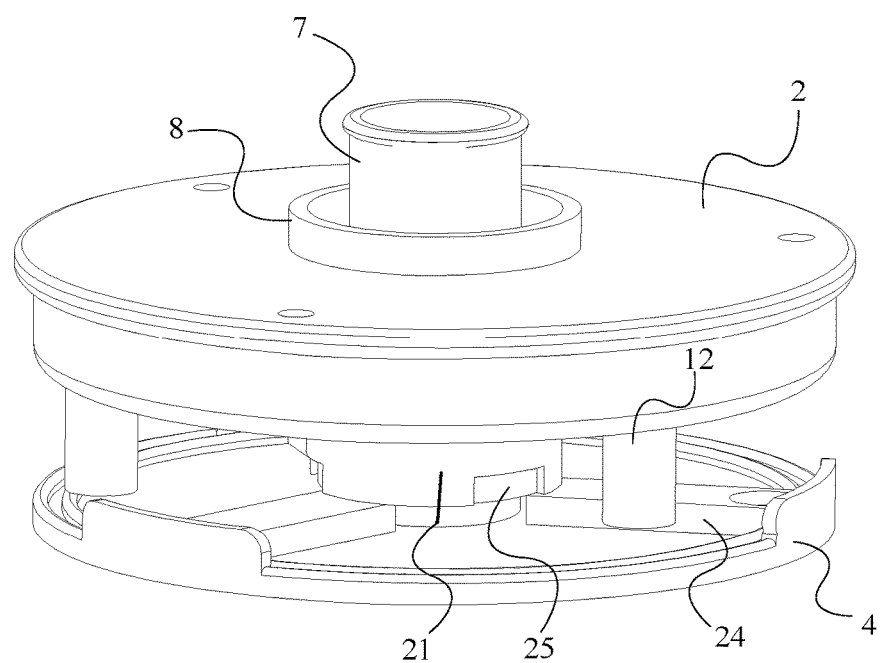
FIG. 17 is a perspective view of the lift and the base in a lifted configuration.

In order to assist the pull and twist mechanism 6, the present invention comprises a brim 21 and a plurality of jack mechanisms 22. In the process of inserting the trimmer blade or the trimmer line, the brim 21 and the plurality of jack mechanisms 22 are utilized to rest the lift 2 when rotating the lift 2 about the base 4. Each of the plurality of jack mechanisms 22 comprises an annular fixture 23, a tab 24, and a slot 25. The annular fixture 23 is peripherally connected to the base 4 such that the corresponding cavity is delineated by the base 4 and the annular fixture 23. The annular fixture 23 helps secure the plurality of blade posts 12 within the plurality of resting cavities 13 in a retracted configuration since the annular fixture 23 is positioned around the corresponding cavity. The tab 24 is laterally connected to the annular fixture 23 and is oriented towards the brim 21. When the plurality of blade posts 12 is in a lifted configuration, the tab 24 is utilized to rest the brim 21 which is laterally connected around the outer tube 8. The slot 25 traverses into the brim 21 and is radially offset from a respective post from the plurality of blade posts 12. The slot 25 is sufficiently sized to receive the tab 24. As illustrated in FIG. 16, when the plurality of jack mechanisms 22 is in the retracted configuration, the tab 24 is engaged to the slot 25. As illustrated in FIG. 17, when the plurality of jack mechanisms 22 is in the lifted configuration, the tab 24 is angularly offset from the slot 25 about the brim 21. In particular, the tab 24 is pressed against the brim 21 when the plurality of blade posts 12 is lifted from the plurality of resting cavities 13 such that the user can proceed to insert or remove the trimmer blades or the trimmer lines.

When utilizing the present invention the following procedure is followed. Initially, the user connects the present invention to a trimmer stem. In doing so, the user inserts the trimmer stem through the first end 18 of the stem sleeve 17. When the preferred embodiment of the present invention is utilized, the trimmer stem attaches to the stem attachment point 1 at the second end 19 of the stem sleeve 17. However, if the stem attachment point 1, which can be, but is not limited to being a nut, needs to be manually inserted into the stem sleeve 17, the user inserts the nut through the inner tube 7 adjacent to the base 4. If the present invention is utilized on a cordless trimmer, a cap of the cordless trimmer is removed, and the spool of trimmer line is removed from the cordless trimmer. Next, the present invention is installed onto the cordless trimmer such that the trimmer stem is positioned within the continuous hollow path created by the outer tube 8, annular rim 9, and the inner tube 7. When the present invention is attached to the trimmer, the user proceeds to installing the trimmer blades or the trimmer lines. As an initial installation step, the user pulls the base 4 away from the lift 2, and twists the lift 2 such that the plurality of jack mechanisms 22 is in the lifted configuration. The pull and twist mechanism 6 is utilized in pulling the base 4 and twisting the lift 2. In the lifted configuration, the tab 24 is angularly offset from the slot 25 and the user can proceed to install the trimmer blade or the trimmer line. When installing the trimmer blade or the trimmer line is completed, the user twists the lift 2 in a direction opposite to the previous twist. As a result, the respective blade post is retracted within the corresponding cavity.

Although the invention has been explained in relation to its preferred embodiment, it is to be understood that many other possible modifications and variations can be made without departing from the spirit and scope of the invention as hereinafter claimed.

What is claimed is:

1. A trimmer head comprises:
 a stem attachment point;
 a lift;
 a base;
 a pull and twist member;
 a plurality of blade posts;
 a plurality of resting cavities;
 the lift and the base being positioned adjacent to each other;
 the lift being retractably and rotatably connected to the base by the pull and twist member;
 the plurality of blade posts being peripherally distributed about the lift;
 the plurality of blade posts being oriented towards the base;
 each of the plurality of blade posts being connected normal to the lift;
 each of the plurality of resting cavities traversing into the base;
 the plurality of resting cavities being perimetrically distributed about the base;
 each of the plurality of blade posts being selectively engaged to a corresponding cavity from the plurality of resting cavities;
 the stem attachment point being positioned in between the lift and the base;
 a continuous hollow path traversing through the lift towards the base and intersecting with the stem attachment point;
 a trimmer interface;
 the trimmer interface comprises a stem sleeve and a cap;
 the cap being mounted onto the lift, opposite to the base;
 the stem sleeve concentrically traversing into an inner tube of the pull and twist member;
 a first end of the stem sleeve being laterally connected to the cap;
 the stem attachment point being internally connected to a second end of the stem sleeve;
 the pull and twist member comprises the inner tube, an outer tube, an annular rim, an annular stopper, and a spring;
 the inner tube being centrally connected onto the base;
 the outer tube being centrally integrated through the lift;
 the annular rim being perimetrically connected within the outer tube;
 the inner tube being slidably engaged through the annular rim;
 the annular stopper being laterally connected to the inner tube, offset from the annular rim;
 the spring being located within the outer tube and around the inner tube;
 the spring being pressed against the annular rim by the annular stopper;
 the stem sleeve, the outer tube, the annular rim, and the inner tube are concentrically positioned with each other in order to form the continuous hollow path, wherein the continuous hollow path is used to receive a trimmer stem;
 a top surface of the base and a bottom surface of the lift are offset from each other;
 the base comprises a bottom and an opening formed on the bottom; and
 the stem attachment point being internally connected to the second end of the stem sleeve via the opening of the base.

2. The trimmer head as claimed in claim 1 comprises:
 a dust cap; and
 the dust cap being attached into the inner tube, adjacent to the base.

3. The trimmer head as claimed in claim 1 comprises:
 a brim;
 a plurality of jack members;
 each of the plurality of jack members comprises an annular fixture, a tab, and a slot;

the annular fixture being peripherally connected onto the base;
the corresponding cavity being delineated by the base and the annular fixture;
the tab being laterally connected to the annular fixture;
the brim being laterally connected around the outer tube of the pull and twist member;
the tab being radially oriented towards of the brim;
the slot laterally traversing into the brim; and
the slot for each of the plurality of jack members being radially offset from a respective post from the plurality of blade posts.

4. The trimmer head as claimed in claim 3 comprises:
wherein when the plurality of jack members is in a retracted configuration,
the tab is engaged to the slot.

5. The trimmer head as claimed in claim 3 comprises:
wherein when the plurality of jack members is in a lifted configuration,
the tab is angularly offset from the slot about the brim, and
the tab is pressed against the brim.

6. A trimmer head comprises:
a stem attachment point;
a lift;
a base;
a pull and twist member;
a plurality of blade posts;
a plurality of resting cavities;
a trimmer interface;
the lift and the base being positioned adjacent to each other;
the lift being retractably and rotatably connected to the base by the pull and twist member;
the plurality of blade posts being peripherally distributed about the lift;
the plurality of blade posts being oriented towards the base;
each of the plurality of blade posts being connected normal to the lift;
each of the plurality of resting cavities traversing into the base;
the plurality of resting cavities being perimetrically distributed about the base;
each of the plurality of blade posts being selectively engaged to a corresponding cavity from the plurality of resting cavities;
the stem attachment point being positioned in between the lift and the base;
a continuous hollow path traversing through the lift towards the base and intersecting with the stem attachment point;
the trimmer interface comprises a stem sleeve and a cap;
the cap being mounted onto the lift, opposite to the base;
the stem sleeve concentrically traversing into an inner tube of the pull and twist member;
a first end of the stem sleeve being laterally connected to the cap;
the stem attachment point being internally connected to a second end of the stem sleeve;
the pull and twist member comprises the inner tube, an outer tube, an annular rim, an annular stopper, and a spring;
the inner tube being centrally connected onto the base;
the outer tube being centrally integrated through the lift;
the annular rim being perimetrically connected within the outer tube;
the inner tube being slidably engaged through the annular rim;
the annular stopper being laterally connected to the inner tube, offset from the annular rim;
the spring being located within the outer tube and around the inner tube;
the spring being pressed against the annular rim by the annular stopper;
the stem sleeve, the outer tube, the annular rim, and the inner tube are concentrically positioned with each other in order to form the continuous hollow path, wherein the continuous hollow path is used to receive a trimmer stem;
the base comprises a bottom and an opening formed on the bottom; and
the stem attachment point being internally connected to the second end of the stem sleeve via the opening of the base.

7. The trimmer head as claimed in claim 6 comprises:
a dust cap; and
the dust cap being attached into the inner tube, adjacent to the base.

8. The trimmer head as claimed in claim 6 comprises:
a brim;
a plurality of jack members;
each of the plurality of jack members comprises an annular fixture, a tab, and a slot;
the annular fixture being peripherally connected onto the base;
the corresponding cavity being delineated by the base and the annular fixture;
the tab being laterally connected to the annular fixture;
the brim being laterally connected around the outer tube of the pull and twist member;
the tab being radially oriented towards of the brim;
the slot laterally traversing into the brim; and
the slot for each of the plurality of jack members being radially offset from a respective post from the plurality of blade posts.

9. The trimmer head as claimed in claim 8 comprises:
wherein when the plurality of jack members is in a retracted configuration,
the tab is engaged to the slot.

10. The trimmer head as claimed in claim 8 comprises:
wherein when the plurality of jack members is in a lifted configuration,
the tab is angularly offset from the slot about the brim, and
the tab is pressed against the brim.

* * * * *